United States Patent

Nasu et al.

(10) Patent No.: US 12,479,784 B2
(45) Date of Patent: Nov. 25, 2025

(54) TRISPHENOL DERIVATIVE

(71) Applicant: HONSHU CHEMICAL INDUSTRY CO., LTD., Tokyo (JP)

(72) Inventors: Akihito Nasu, Wakayama (JP); Kentaro Yamane, Wakayama (JP)

(73) Assignee: HONSHU CHEMICAL INDUSTRY CO., LTD., Tokyo (JP)

( * ) Notice: Subject to any disclaimer, the term of this patent is extended or adjusted under 35 U.S.C. 154(b) by 490 days.

(21) Appl. No.: 18/003,128

(22) PCT Filed: Jun. 23, 2021

(86) PCT No.: PCT/JP2021/023706
§ 371 (c)(1),
(2) Date: Dec. 22, 2022

(87) PCT Pub. No.: WO2022/004506
PCT Pub. Date: Jan. 6, 2022

(65) Prior Publication Data
US 2023/0234905 A1     Jul. 27, 2023

(30) Foreign Application Priority Data
Jun. 29, 2020   (JP) ................................. 2020-111918

(51) Int. Cl.
| C07C 39/16 | (2006.01) |
| C07C 43/178 | (2006.01) |
| C07C 69/21 | (2006.01) |
| C07C 215/56 | (2006.01) |

(52) U.S. Cl.
CPC .......... *C07C 39/16* (2013.01); *C07C 43/1782* (2013.01); *C07C 69/21* (2013.01); *C07C 215/56* (2013.01)

(58) Field of Classification Search
CPC ...... C07C 39/16; C07C 43/1782; C07C 69/21
See application file for complete search history.

(56) References Cited

U.S. PATENT DOCUMENTS

| 4,239,803 A | 12/1980 | Ohzeki et al. |
| 5,488,182 A | 1/1996 | Kobayashi et al. |
| 2012/0296053 A1 | 11/2012 | Hanamura et al. |

FOREIGN PATENT DOCUMENTS

| JP | S52154851 A | 12/1977 |
| JP | S5443952 A | 4/1979 |
| JP | S57190098 A | 11/1982 |
| JP | H0717888 A | 1/1995 |
| JP | H0772623 A | 3/1995 |
| JP | 2007016214 A | 1/2007 |
| JP | 2012256023 A | 12/2012 |
| JP | 2019099754 A | 6/2019 |

OTHER PUBLICATIONS

International Preliminary Report on Patentability, dated Dec. 13, 2022, for corresponding international application PCT/JP2021/023706 (1 page).
Notification Concerning Transmittal of International Preliminary Report on Patentability, mailed Jan. 12, 2023, for corresponding international application PCT/JP2021/023706 (1 page).
Notification of Transmittal of Translation of the International Preliminary Report on Patentability, mailed Jan. 12, 2023, for corresponding international application PCT/JP2021/023706 (1 page).
Written Opinion of the International Searching Authority, mailed Aug. 17, 2021, for corresponding international application PCT/JP2021/023706 (4 pages).
International Search Report (ISR) mailed Aug. 17, 2021, issued for International application No. PCT/JP2021/023706. (3 pages).

*Primary Examiner* — Sikarl A Witherspoon
(74) *Attorney, Agent, or Firm* — Law Office of Katsuhiro Arai

(57) ABSTRACT

In order to provide a novel compound that has good solvent solubility, has high storage stability (dissolution stability) during refrigerated or frozen storage, and can be used as a crosslinking agent, a substituted trisphenol compound represented by formula (2) below is provided:

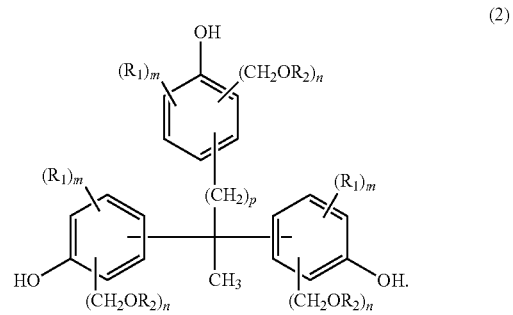

(2)

3 Claims, No Drawings

TRISPHENOL DERIVATIVE

CROSS-REFERENCE TO RELATED APPLICATIONS

This application is the U.S. National Phase under 35 U.S.C. § 371 of International Application PCT/JP2021/023706, filed Jun. 23, 2021, which claims priority to Japanese Patent Application No. JP2020-111918, filed Jun. 29, 2020. The International Application was published under PCT Article 21(2) in a language other than English.

TECHNICAL FIELD

The present invention relates to a novel trisphenol derivative having good solvent solubility and high storage stability.

BACKGROUND ART

To improve film properties of photosensitive resins, phenolic methylol compounds and methoxymethyl compounds have been conventionally used as crosslinking agents. As crosslinking agents, compounds with large numbers of crosslinking groups per molecule have been preferred because crosslinking reactions proceed with high efficiency to provide stable film properties. For example, compounds represented by the following chemical structures have been reported as methoxymethyl-containing phenol compounds that exhibit sufficient film-hardening performance in small amounts (for example, PTLs 1 and 2).

[Chem. 1]

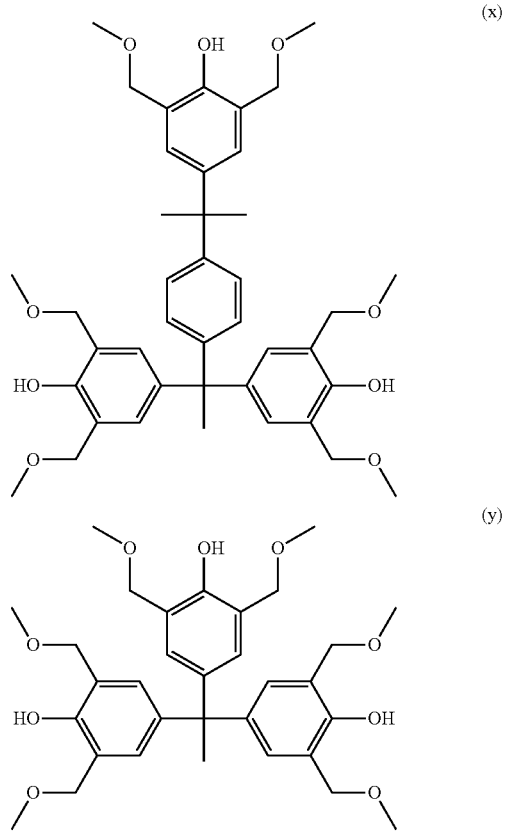

CITATION LIST

Patent Literature

PTL 1: Japanese Unexamined Patent Application Publication No. 07-017888

PTL 2: Japanese Unexamined Patent Application Publication No. 2007-016214

SUMMARY OF INVENTION

Technical Problem

Phenolic methylol compounds and methoxymethyl compounds are preferably stored refrigerated or frozen since they undergo crosslinking if stored at temperatures higher than room temperature. Solution products obtained using these compounds, such as photosensitive resin compositions (varnishes), photoresists, and paints, are also required to be stored under refrigeration from the viewpoint of quality maintenance stability during storage, while the materials are sometimes brought into solution in advance and used from the viewpoint of production efficiency.

The inventors have recognized the following problem: compound (x) and compound (y) represented by the above chemical structures characteristically tend to crystallize due to the symmetry of their basic skeleton and thus do not dissolve much in solvents as in experimental examples described later. The inventors have also recognized the following problem: even if a desired high-concentration solution is successfully prepared at room temperature, crystals will precipitate if the solution is stored refrigerated or frozen, and thus in the case of refrigerated or frozen storage, only a low-concentration solution from which no crystals will precipitate can be prepared, which limits the amount in which the compounds can be added as crosslinking agents.

The present invention has been made in view of the foregoing circumstances, and an object thereof is to provide a novel compound that has good solvent solubility, has high storage stability (dissolution stability) during refrigerated or frozen storage, and can be used as a crosslinking agent.

Solution to Problem

As a result of intensive studies to solve the above problems, the present inventors have found that introducing flexibility of a basic skeleton including a linear alkylene group, particularly, the basic skeleton of raspberry ketone (4-(hydroxyphenyl)-2-butanone), instead of basic skeletons of conventionally known compounds (for example, PTLs 1 and 2) suppresses crystallization and also improves solvent solubility, thereby completing the present invention. This crystallization suppression and improvement of solvent solubility is believed to be due to the introduction of the basic skeleton and a consequent decrease in the likelihood of stacking of molecules.

The present invention is as follows.

1. A substituted trisphenol compound represented by formula (1):

[Chem. 2]

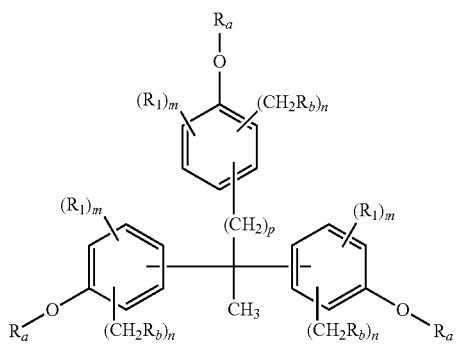

(1)

(where $R_1$'s each independently represent a linear, branched, or cyclic alkyl group having 1 to 6 carbon atoms or a phenyl group, $R_a$'s each independently represent a hydrogen atom or a substituted carbonyl group, $R_b$'s each independently represent a substituent, n represents an integer of 1 or 2, m represents 0 or an integer of 1 to 3, and p represents an integer of 1 to 6, provided that m+n is an integer of 1 to 4).

2. A substituted trisphenol compound represented by formula (2):

[Chem. 3]

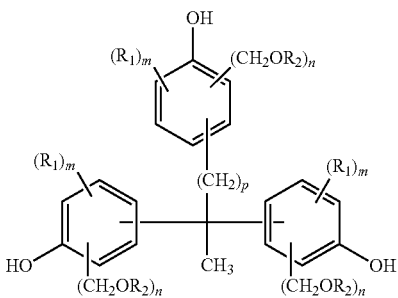

(2)

(where $R_1$'s each independently represent a linear, branched, or cyclic alkyl group having 1 to 6 carbon atoms or a phenyl group, $R_2$'s each independently represent a hydrogen atom or a linear, branched, or cyclic alkyl group having 1 to 6 carbon atoms, n represents an integer of 1 or 2, m represents 0 or an integer of 1 to 3, and p represents an integer of 1 to 6, provided that m+n is an integer of 1 to 4).

3. A substituted trisphenol compound represented by formula (3):

[Chem. 4]

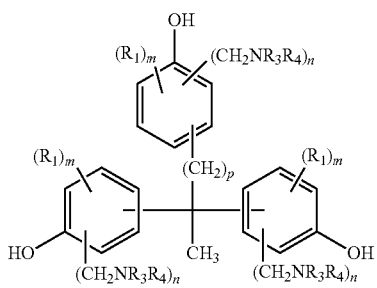

(3)

(where $R_1$'s each independently represent a linear, branched, or cyclic alkyl group having 1 to 6 carbon atoms or a phenyl group, $R_3$'s and $R_4$'s each independently represent a linear, branched, or cyclic alkyl group having 1 to 6 carbon atoms or an aryl group having 6 to 8 carbon atoms, $R_3$ and $R_4$ are optionally bonded to each other to together form a cyclic secondary amino group optionally containing an oxygen atom or a sulfur atom and having 5 to 10 carbon atoms, n represents an integer of 1 or 2, m represents 0 or an integer of 1 to 3, and p represents an integer of 1 to 6, provided that m+n is an integer of 1 to 4).

4. A substituted trisphenol compound represented by formula (4):

[Chem. 5]

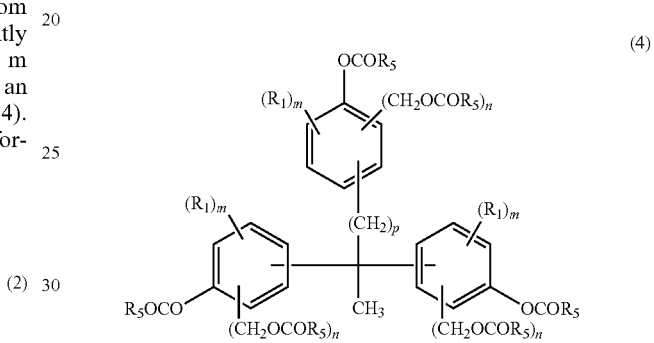

(4)

(where $R_1$'s each independently represent a linear, branched, or cyclic alkyl group having 1 to 6 carbon atoms or a phenyl group, $R_5$'s each independently represent a linear, branched, or cyclic alkyl group having 1 to 6 carbon atoms or an aryl group having 6 to 8 carbon atoms, n represents an integer of 1 or 2, m represents 0 or an integer of 1 to 3, and p represents an integer of 1 to 6, provided that m+n is an integer of 1 to 4).

Advantageous Effects of Invention

The novel compound of the present invention has a great advantage of having good solvent solubility and having high storage stability (dissolution stability) during refrigerated or frozen storage.

In addition, the novel compound of the present invention, when used as a crosslinking agent, can provide a photosensitive resin with improved film properties, and thus is useful.

Furthermore, the novel compound of the present invention can also be used as a curing agent for an epoxy resin.

DESCRIPTION OF EMBODIMENTS

The present invention will now be described in detail.

<Inventive Compound>

A compound of the present invention is a substituted trisphenol compound represented by formula (1) below.

[Chem. 6]

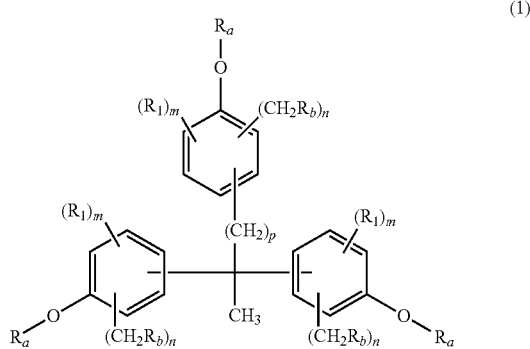

(In the formula, $R_1$'s each independently represent a linear, branched, or cyclic alkyl group having 1 to 6 carbon atoms or a phenyl group, $R_a$'s each independently represent a hydrogen atom or a substituted carbonyl group, $R_b$'s each independently represent a substituent, n represents an integer of 1 or 2, m represents 0 or an integer of 1 to 3, and p represents an integer of 1 to 6, provided that m+n is an integer of 1 to 4.)

Among the substituted trisphenol compounds represented by formula (1), preferred compounds are the substituted trisphenol compounds represented by formulae (2) to (4) above. That is, $R_a$ in formula (1) is preferably a hydrogen atom or —$COR_5$ ($R_5$ represents a linear, branched, or cyclic alkyl group having 1 to 6 carbon atoms or an aryl group having 6 to 8 carbon atoms), and $R_b$ is preferably —$OR_2$ ($R_2$ represents a hydrogen atom or a linear, branched, or cyclic alkyl group having 1 to 6 carbon atoms), —$NR_3R_4$ ($R_3$ and $R_4$ each independently represent a linear, branched, or cyclic alkyl group having 1 to 6 carbon atoms or an aryl group having 6 to 8 carbon atoms), or —$OCOR_5$ ($R_5$ represents a linear, branched, or cyclic alkyl group having 1 to 6 carbon atoms or an aryl group having 6 to 8 carbon atoms).

$R_1$'s in formulae (1) to (4) each independently represent a linear, branched, or cyclic alkyl group having 1 to 6 carbon atoms or a phenyl group. Of these, a linear or branched alkyl group having 1 to 4 carbon atoms, a cyclohexyl group, or a phenyl group is preferred, a linear or branched alkyl group having 1 to 4 carbon atoms or a cyclohexyl group is more preferred, and a methyl group or a cyclohexyl group is particularly preferred.

m in formulae (1) to (4) represents 0 or an integer of 1 to 3. In particular, m is preferably 0, 1, or 2, more preferably 0 or 1. When m is 1, the substitution position of $R_1$ on each benzene ring is preferably ortho to the hydroxy group or $\mu OCOR_5$.

p in formulae (1) to (4) represents an integer of 1 to 6. In particular, p is preferably an integer of 1 to 4, more preferably 1 or 2, particularly preferably 2.

$R_2$'s in formula (2) each independently represent a hydrogen atom or a linear, branched, or cyclic alkyl group having 1 to 6 carbon atoms. Of these, a linear or branched alkyl group having 1 to 4 carbon atoms is preferred, a methyl group or an ethyl group is more preferred, and a methyl group is particularly preferred. The substitution position of —$CH_2OR_2$ on each benzene ring in formula (2) is preferably ortho to the hydroxy group.

$R_3$'s and $R_4$'s in formula (3) each independently represent a linear, branched, or cyclic alkyl group having 1 to 6 carbon atoms or an aryl group having 6 to 8 carbon atoms. Of these, a linear, branched, or cyclic alkyl group having 1 to 6 carbon atoms is preferred, a linear or branched alkyl group having 1 to 6 carbon atoms is more preferred, a linear or branched alkyl group having 1 to 4 carbon atoms is still more preferred, and a methyl group is particularly preferred.

When $R_3$ and $R_4$ together form a cyclic secondary amino group optionally containing an oxygen atom or a sulfur atom and having 5 to 10 carbon atoms, specific examples include cyclic secondary amino groups represented by the following formulae, and these are particularly preferred.

[Chem. 7]

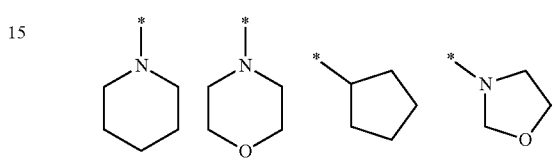

(In the formulae, * denotes a linking group.)

The substitution position of —$CH_2NR_3R_4$ on each benzene ring in formula (3) is preferably ortho to the hydroxy group.

$R_5$'s in formula (4) each independently represent a linear, branched, or cyclic alkyl group having 1 to 6 carbon atoms or an aryl group having 6 to 8 carbon atoms. Of these, a linear or branched alkyl group having 1 to 6 carbon atoms or an aryl group having 6 to 8 carbon atoms is preferred, a linear or branched alkyl group having 1 to 6 carbon atoms or a phenyl group is more preferred, a linear or branched alkyl group having 1 to 4 carbon atoms is still more preferred, and a methyl group is particularly preferred.

The substitution position of —$CH_2OCOR_5$ on each benzene ring in formula (4) is preferably ortho to —$OCOR_5$.

<Substituted Trisphenol Compound Represented by Formula (2)>

As the substituted trisphenol compound represented by formula (2), which is a compound of the present invention, a preferred compound is a substituted trisphenol compound represented by formula (2a) below where the hydroxy group is in the para position, and a more preferred compound is a substituted trisphenol compound represented by formula (2a) where "p" is 2, that is, formula (2b) below.

[Chem. 8]

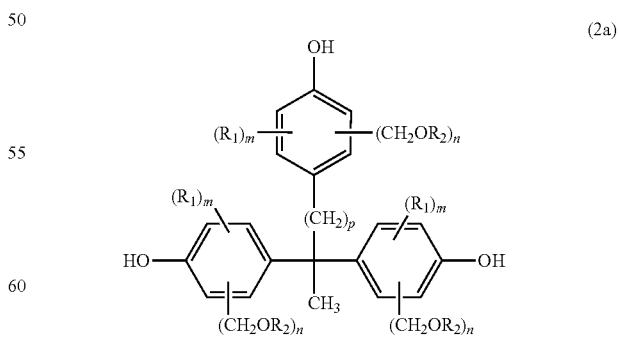

(In the formula, $R_1$, $R_2$, m, n, and p are as defined in formula (2).)

Specific examples and preferred examples of $R_1$, $R_2$, m, n, and p in formula (2a) are the same as those in formula (2).

[Chem. 9]

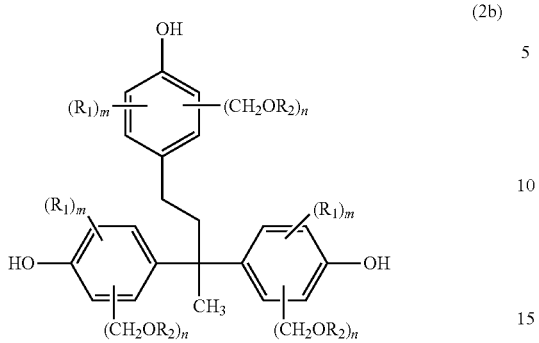

(In the formula, $R_1$, $R_2$, m, and n are as defined in formula (2).)

Specific examples and preferred examples of $R_1$, $R_2$, m, and n in formula (2b) are the same as those in formula (2).

Among the substituted trisphenol compounds represented by formula (2b) which are more preferred compounds, compounds represented by the following chemical structural formulae are particularly preferred.

[Chem. 10]

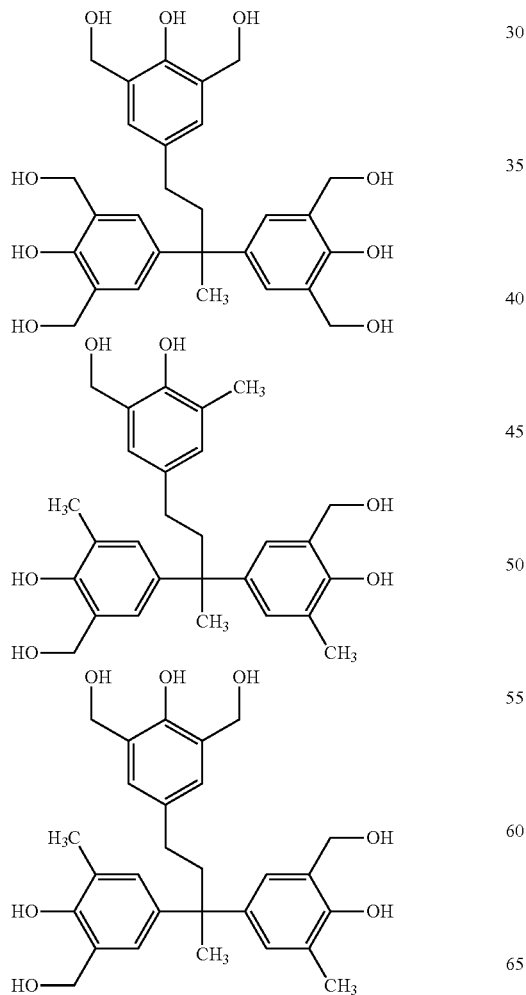

-continued

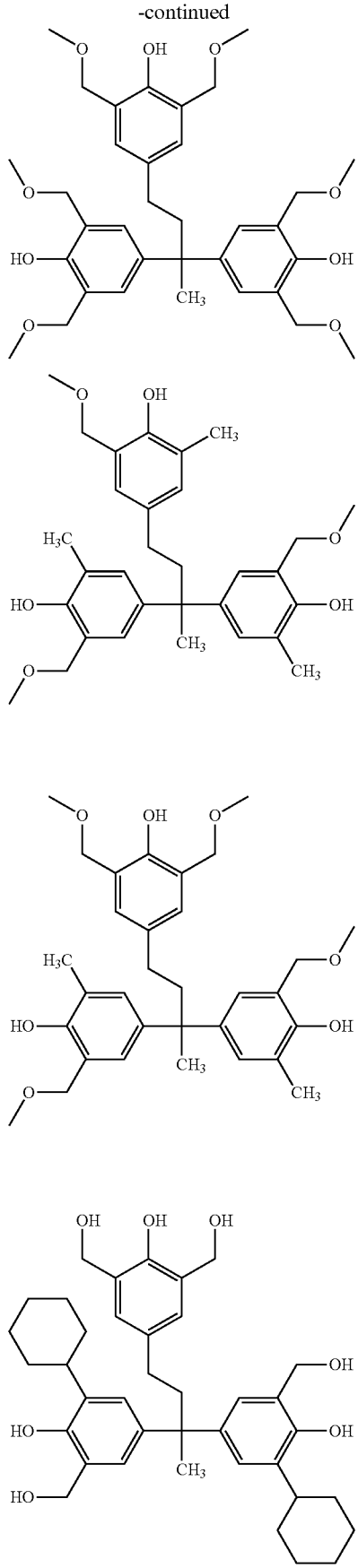

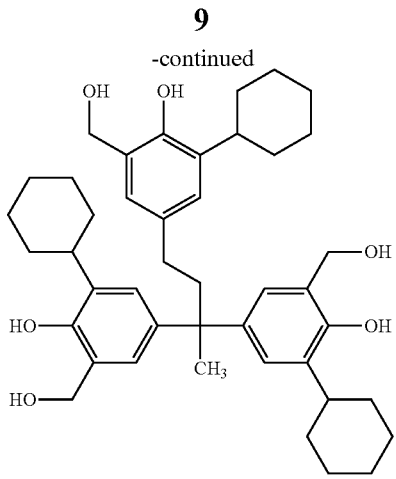

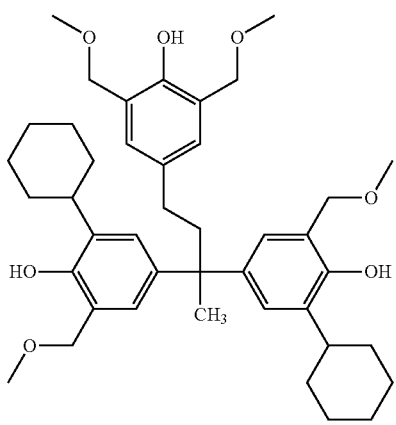

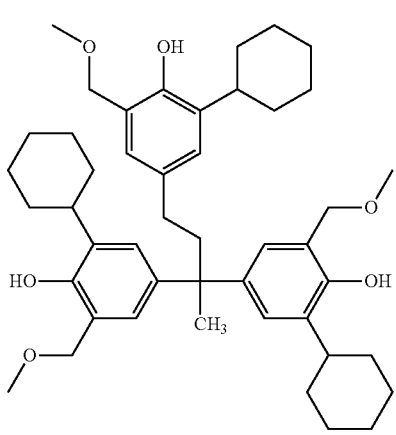

<Substituted Trisphenol Compound Represented by Formula (3)>

As the substituted trisphenol compound represented by formula (3), which is a compound of the present invention, a preferred compound is a substituted trisphenol compound represented by formula (3a) below where the hydroxy group is in the para position, and a more preferred compound is a substituted trisphenol compound represented by formula (3a) where "p" is 2, that is, formula (3b) below.

[Chem. 11]

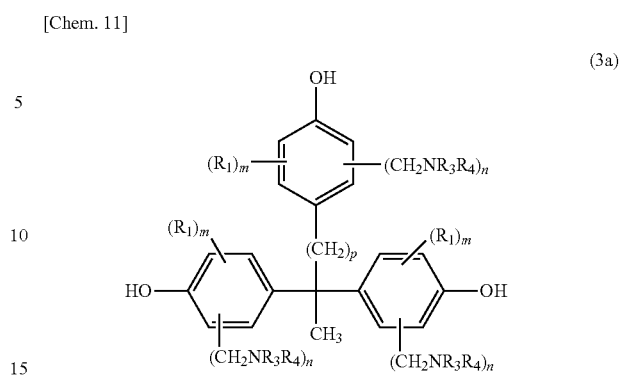

(3a)

(In the formula, $R_1$, $R_3$, $R_4$, m, n, and p are as defined in formula (3).)

Specific examples and preferred examples of $R_1$, $R_3$, $R_4$, m, n, and p in formula (3a) are the same as those in formula (3).

[Chem. 12]

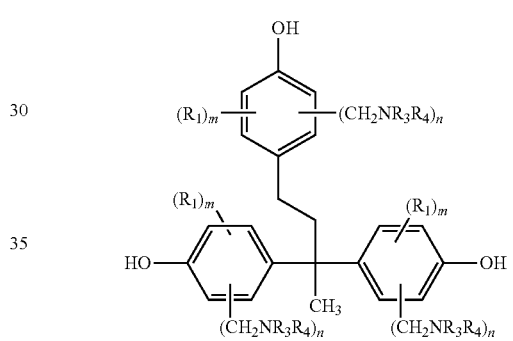

(3b)

(In the formula, $R_1$, $R_3$, $R_4$, m, and n are as defined in formula (3).)

Specific examples and preferred examples of $R_1$, $R_3$, $R_4$, m, and n in formula (3b) are the same as those in formula (3).

Among the substituted trisphenol compounds represented by formula (3b) which are more preferred compounds, compounds represented by the following chemical structural formulae are particularly preferred.

[Chem. 13]

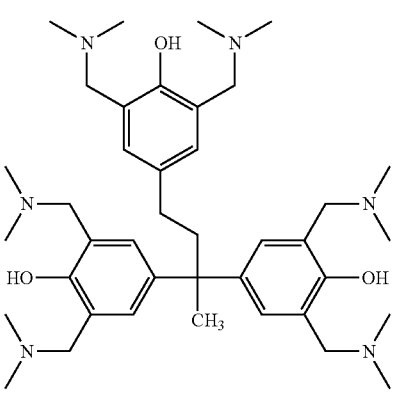

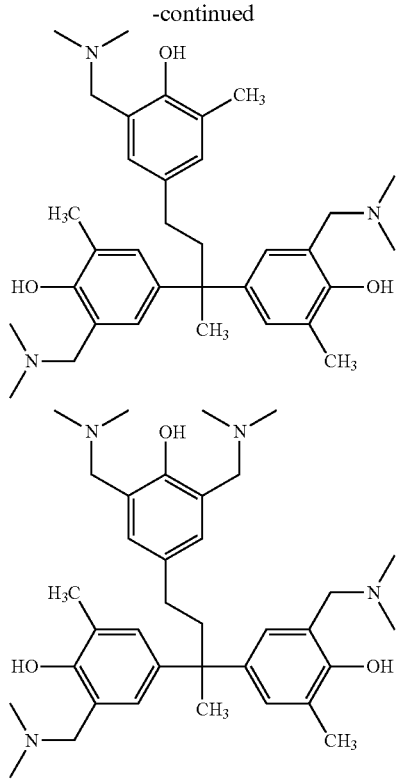

<Substituted Trisphenol Compound Represented by Formula (4)>

As the substituted trisphenol compound represented by formula (4), which is a compound of the present invention, a preferred compound is a substituted trisphenol compound represented by formula (4a) below where —$OCOR_5$ is in the para position, and a more preferred compound is a substituted trisphenol compound represented by formula (4a) where "p" is 2, that is, formula (4b) below.

[Chem. 14]

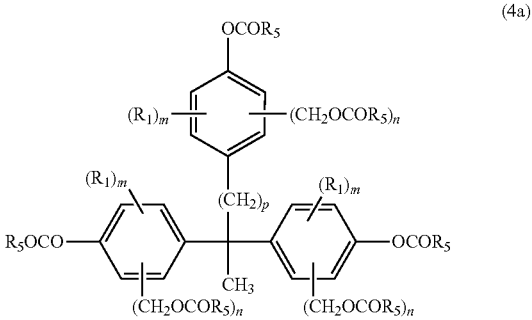

(4a)

(In the formula, $R_1$, $R_5$, m, n, and p are as defined in formula (4).)

Specific examples and preferred examples of $R_1$, $R_5$, m, n, and p in formula (4a) are the same as those in formula (4).

[Chem. 15]

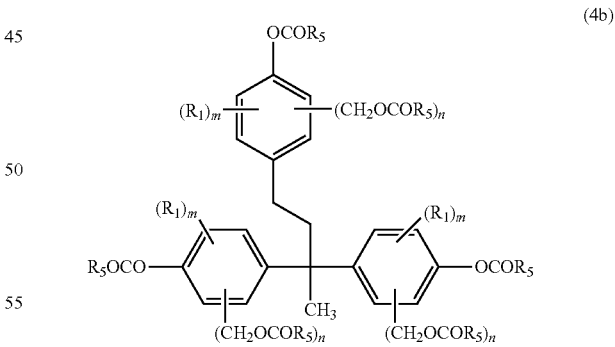

(4b)

(In the formula, $R_1$, $R_5$, m, and n are as defined in formula (4).)

Specific examples and preferred examples of $R_1$, $R_5$, m, and n in formula (4b) are the same as those in formula (4).

Among the substituted trisphenol compounds represented by formula (4b) which are more preferred compounds, compounds represented by the following chemical structural formulae are particularly preferred.

[Chem. 16]
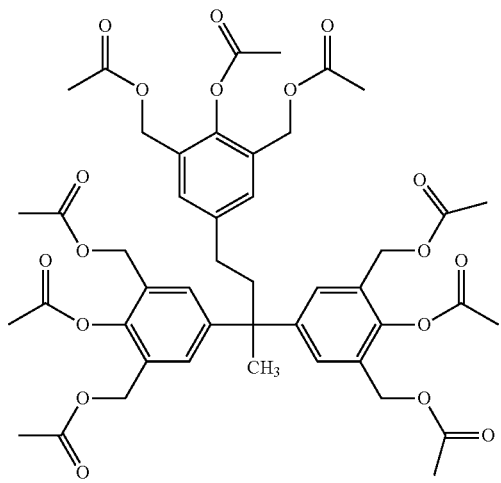
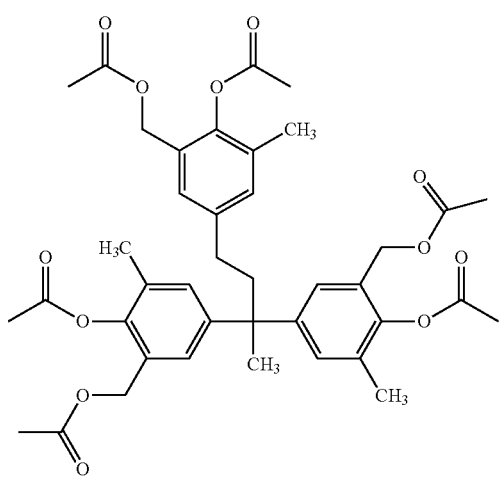
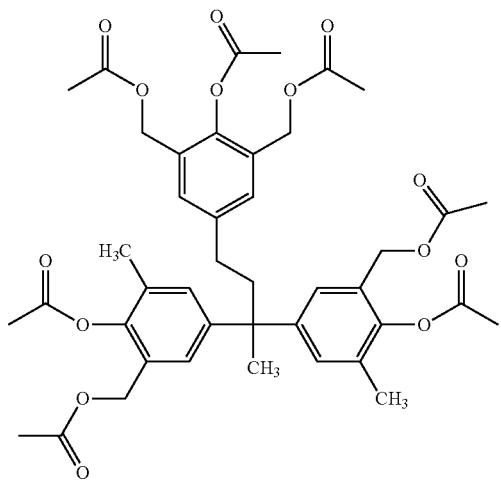
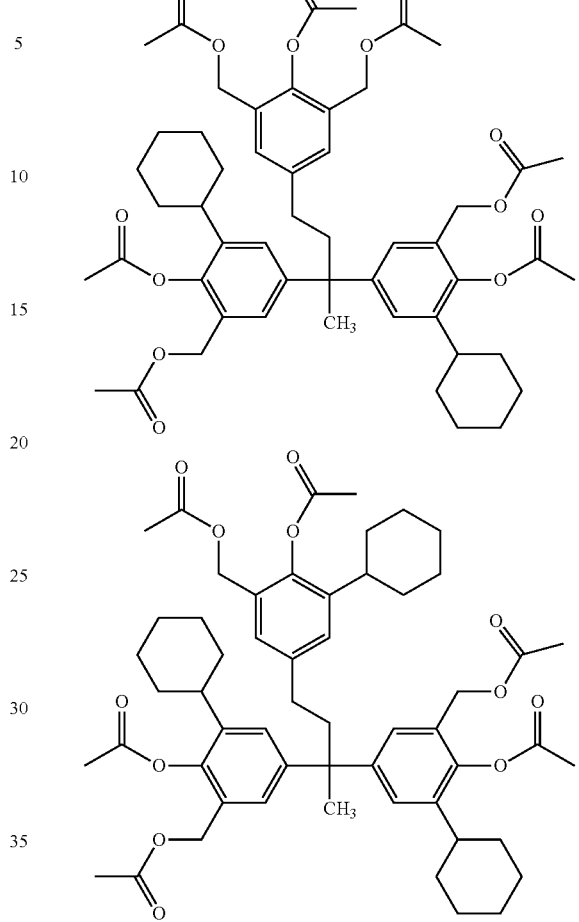
<Method for Producing Inventive Compound>
A starting material (7) for the inventive compound is produced by a condensation reaction between a ketone (5) having a hydroxyphenyl group and a phenol (6), as shown by the following reaction formula. This condensation reaction can be performed according to known reaction conditions.
[Chem. 17]
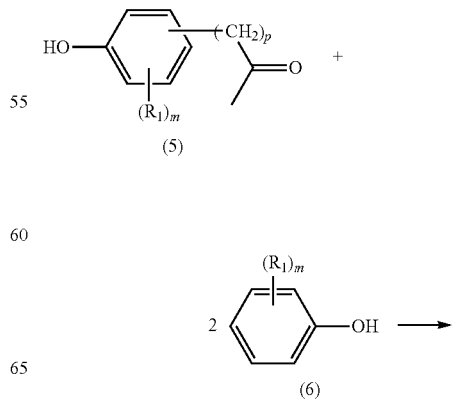

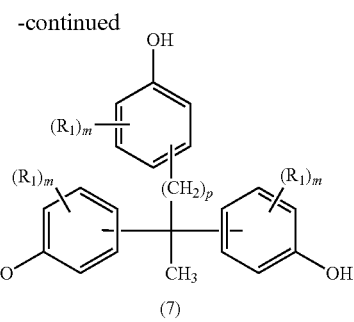

(7)

($R_1$, m, and p in the formula are as defined in formulae (1) to (4).)

The ketone (5) having a hydroxyphenyl group in the above production method can be produced by, for example, a method described in Japanese Unexamined Patent Application Publication No. 51-32532, and specific examples include 4-(4-hydroxyphenyl)butan-2-one (CAS registry number: 5471-51-2), 4-(4-hydroxy-3-methylphenyl)butan-2-one (CAS registry number: 125101-98-6), 4-(4-hydroxy-2-methylphenyl)butan-2-one (CAS registry number: 91969-86-7), 4-(4-hydroxy-3-isopropylphenyl)butan-2-one (CAS registry number: 96713-34-7), 4-(4-hydroxy-3-t-butylphenyl)butan-2-one (CAS registry number: 54685-33-5), 4-(4-hydroxy-3-cyclohexylphenyl)butan-2-one (CAS registry number: 60561-24-2), 4-(4-hydroxy-2,6-dimethylphenyl)butan-2-one (CAS registry number: 125102-00-3), 4-(4-hydroxy-2,3-dimethylphenyl)butan-2-one (CAS registry number: 125102-01-4), 4-(4-hydroxy-3,5-dimethylphenyl)butan-2-one (CAS registry number: 91374-58-2), and 4-(4-hydroxy-3,5-dibutylphenyl)butan-2-one (CAS registry number: 5082-72-4). Among them, 4-(4-hydroxyphenyl)butan-2-one is particularly preferred.

Alternatively, the starting material (7) for the inventive compound can also be produced by a reaction between a halogenated ketone (8) and a phenol (6), as shown by the following reaction formula. This reaction can be performed according to known reaction conditions.

[Chem.18]

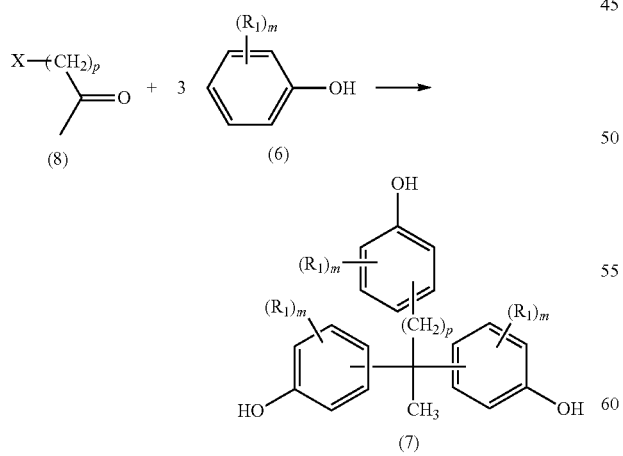

($R_1$, m, and p in the formula are as defined in formulae (1) to (4), and X represents a halogen atom.)

Specific examples of the halogenated ketone (8) in the above production method include fluoroacetone, chloroacetone, bromoacetone, iodoacetone, 4-fluoro-2-butanone, 4-chloro-2-butanone, 4-bromo-2-butanone, 4-iodo-2-butanone, 5-chloro-2-pentanone, 5-bromo-2-pentanone, 5-iodo-2-pentanone, 6-chloro-2-hexanone, 6-bromo-2-hexanone, 6-iodo-2-hexanone, 7-chloro-2-pentanone, 7-bromo-2-pentanone, 7-iodo-2-pentanone, 8-chloro-2-octanone, 8-bromo-2-octanone, and 8-iodo-2-octanone.

<Production Method 1>

As a production method 1 of the inventive compound, a method involving the formation of an intermediary methylol compound will be specifically described by taking the following method for producing a preferred compound as an example. Compounds in the following reaction formula are hereinafter referred to as "compound (A1)", "compound (B1)", and "compound (C1)".

[Chem. 19]

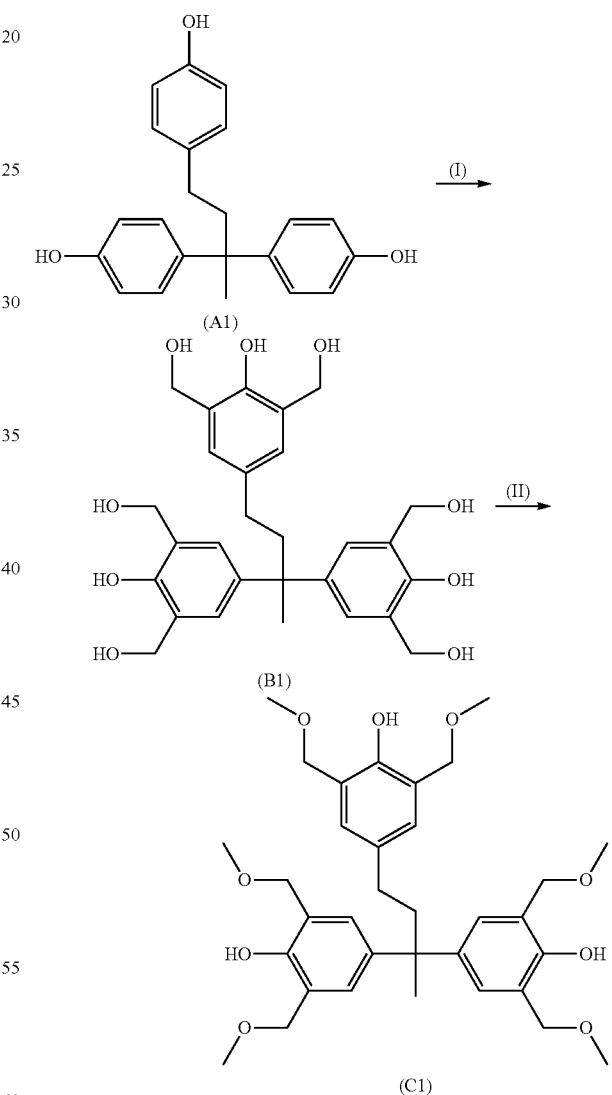

(Step I)

The first step (I) will be described below.

In a water solvent or a mixed solvent of water and an organic solvent, compound (A1) as a starting material is reacted with formaldehyde in an amount of 6 to 12 mol, preferably 9 mol, relative to 1 mol of compound (A1) in the presence of a basic catalyst, and the resulting reaction product is then neutralized, whereby a target can be obtained. As formaldehyde in the production method, a commercially available product such as a 35% aqueous formalin solution can be used as it is, or paraformaldehyde or trioxane, which acts similarly to formaldehyde, can be used in the presence of water, but it is preferable to use formalin.

Examples of the basic catalyst include alkali metal hydroxides and alkaline-earth metal hydroxides such as sodium hydroxide, potassium hydroxide, lithium hydroxide, calcium hydroxide, and magnesium hydroxide; and strong organic bases such as tetramethylammonium hydroxide. In particular, alkali metal hydroxides such as sodium hydroxide and potassium hydroxide and strong organic bases such as tetramethylammonium hydroxide are preferred, and 10 to 40 wt % aqueous solutions of these bases are preferably used. In the step (I), the basic catalyst is used preferably in an amount of 2.5 to 3.5 mol, more preferably in an amount of 3 mol per mol of compound (A1) as a starting material.

The reaction of the step (I) is typically performed in a water solvent or a mixed solvent of water and an organic solvent. Such a solvent is not necessary if an aqueous alkaline solution of the basic catalyst partially or fully dissolves compound (A1) as a starting material and a stirrable reaction mixture is provided. However, when a solvent is necessary, it is typically used in an amount in the range of preferably about 1 to 5 times, more preferably about 2 to 3 times that of compound (A1) as a starting material on a weight basis.

As the organic solvent, for example, an alcohol such as methanol, ethanol, n-propyl alcohol, isopropyl alcohol, n-butanol, ethylene glycol, ethylene glycol monomethyl ether, diethylene glycol, or carbitol; an aromatic hydrocarbon such as toluene or xylene; or a water-soluble aprotic polar solvent such as dimethylsulfoxide, N-methylpyrrolidone, or dimethylformamide is used to the extent that the solubility of a water solvent mixture solution of the basic catalyst and compound (A1) as a starting material is not impaired.

The reaction of the step (I) is performed at typically 20° C. to 50° C., preferably 25° C. to 40° C., more preferably 30° C. to 35° C., for typically 1 to 72 hours, preferably about 4 to 16 hours. When the reaction temperature is lower than 20° C., the reaction proceeds slowly, and when the reaction temperature is higher than 50° C., a large amount of various unwanted by-products such as polymer impurities are produced, which are not preferred.

To separate and recover the target compound (B1) from the resulting reaction mixture after completion of the reaction between compound (A1) as a starting material and formaldehyde in the presence of the basic catalyst, an acid such as sulfuric acid is added to the final reaction mixture after completion of the reaction to neutralize the alkali salt of the target and the alkali catalyst. Subsequently, to separate and remove an aqueous layer, a solvent separable from water, such as an aromatic hydrocarbon such as toluene or xylene, is added as needed, and the aqueous layer is then separated. The oil layer obtained is washed with water, and low-boiling compounds including the solvent and formaldehyde are then distilled off from the oil layer, whereby the target compound (B1) can be obtained.

Compound (B1) obtained may be purified but is preferably used directly in the next step (II).

(Step II)

The next step (II) will be described below.

Using compound (B1) obtained in the step (I) as a material, this is reacted with methanol in the presence of an acid catalyst, whereby the target compound (C1) can be obtained. Here, instead of methanol, a saturated aliphatic alcohol having 2 to 4 carbon atoms, such as ethyl alcohol, n-propyl alcohol, isopropyl alcohol, or n-butyl alcohol, can be reacted to replace the methoxymethyl group of compound (C1) with a different alkoxymethyl group.

As the acid catalyst, concentrated sulfuric acid, hydrochloric acid, nitric acid, phosphoric acid, p-toluenesulfonic acid, methanesulfonic acid, trifluoromethanesulfonic acid, a cation-exchange resin (acid type), oxalic acid, or the like is preferably used. More preferred is a strong inorganic acid such as concentrated sulfuric acid. The acid catalyst is used in an amount typically in the range of 20 to 40 wt %, preferably 30 wt %, relative to the amount of compound (B1). When the amount of the acid catalyst is smaller than 20 wt %, the reaction proceeds slowly, and when the amount of the acid catalyst exceeds 40 wt %, the reaction proceeds excessively to produce a large amount of impurities, which are not preferred.

The methanol is typically used in excess relative to compound (B1) so as to also serve as a reaction solvent. The amount used is not particularly limited but is typically in the range of 6 to 12 times, preferably 9 times that of compound (B1) on a weight basis.

The reaction temperature in the step (II) is typically in the range of 40° C. to 70° C., preferably in the range of 50° C. to 65° C., more preferably in the range of 55° C. to 60° C. When the reaction temperature is lower than 40° C., the formation of polymers occurs preferentially, which is not preferred, and when the reaction temperature is higher than 70° C., the reaction proceeds rapidly to form a large amount of polymers, which is not preferred. The reaction time is typically about 1 to 240 hours, preferably about 5 to 100 hours.

After completion of the reaction, the target compound (C1) can be isolated from the resulting reaction mixture according to a conventional method. For example, after completion of the reaction, the resulting reaction mixture is neutralized with an alkali such as an aqueous sodium hydroxide solution, after which excess methanol also serving as a reaction solvent is removed as needed by, for example, distillation, and a salt formed by the neutralization is then filtered off, whereby a crude product of the target can be obtained. If necessary, inorganic salts can be removed by dissolving the crude product in a solvent such as an aromatic hydrocarbon such as toluene or xylene, performing washing with water several times, and then separating an aqueous layer. If further purification is necessary, separation and purification may be performed by column chromatography.

<Production Method 2>

As a production method 2 of the inventive compound, a method involving the formation of an aminomethyl intermediate and an acetyl intermediate will be described by taking the following reaction formula of a preferred compound as an example. Compounds in the following reaction formula are referred to as "compound (D1)" and "compound (E1)" in addition to "compound (A1)" and "compound (C1)" described above.

[Chem. 20]

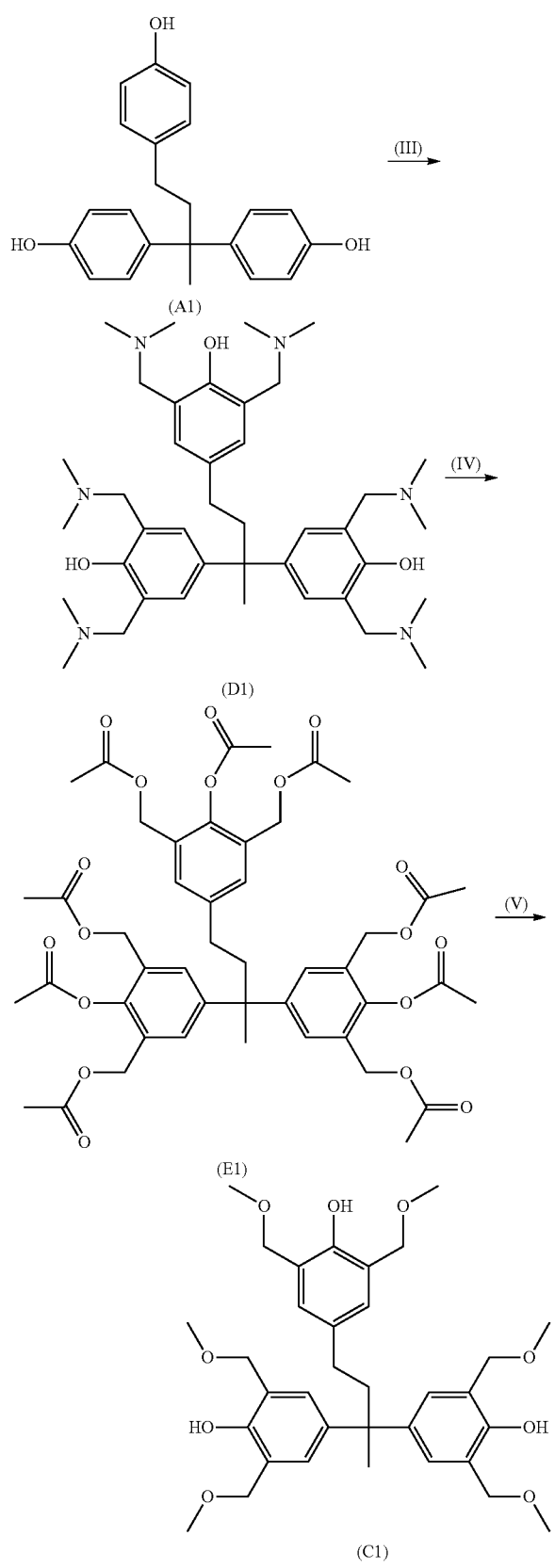

(Step III)

The first step (III) will be described below.

The step (III) is a step of reacting compound (A1) as a starting material with formaldehyde and dimethylamine in a solvent to obtain compound (D1). This reaction can be readily performed by a method in accordance with the known Mannich reaction. Formaldehyde may be an aqueous formaldehyde solution or paraformaldehyde. Instead of dimethylamine, a secondary amine such as diethylamine, dibutylamine, diisopropylamine, pyrrolidine, piperidine, piperazine, morpholine, or oxazolidine can be used to replace the dimethylamino group of compound (D1) with a different amino group.

In the step (III), addition of acetic acid as a catalyst is preferred because the progress of the reaction is accelerated, but addition of acetic acid in an amount exceeding 1 mol per mol of dimethylamine is not preferred because the progress of the reaction is slowed down rather than accelerated.

In the step (III), the amounts of formaldehyde and dimethylamine used relative to the amount of compound (A1) as a starting material are preferably equal to or greater than stoichiometric amounts. Specifically, the amount of dimethylamine used is preferably in the range of 6 to 12 mol, more preferably in the range of 8 to 10 mol per mol of compound (A1) as a starting material. Similarly, the amount of formaldehyde used is preferably in the range of 6 to 12 mol, more preferably in the range of 8 to 10 mol per mol of compound (A1) as a starting material.

In the reaction, a reaction solvent may be but need not be used. When a reaction solvent is used, the reaction solvent is not particularly limited as long as it is a solvent known in the reaction, and specific examples thereof include water; ether solvents such as diethyl ether, dibutyl ether, and tetrahydrofuran; alcohol solvents such as methanol, ethanol, propanol, and butanol; aromatic hydrocarbon solvents such as toluene and xylene; ketone solvents such as acetone and methyl isobutyl ketone; ester solvents such as ethyl acetate and γ-butyrolactone; nitrile solvents such as acetonitrile; and aprotic polar solvents such as N-methylpyrrolidone, N-methyl-2-pyrrolidone, N,N-dimethylformamide, and N,N-dimethylacetamide. These solvents may be used alone or as a mixture of two or more.

The amount of solvent used is not particularly limited, but is preferably in the range of 0.5 to 20 times, more preferably in the range of 1 to 5 times that of compound (A1) as a starting material on a weight basis.

The reaction temperature in the step (III) is preferably in the range of 30° C. to 100° C., more preferably in the range of 60° C. to 90° C., still more preferably in the range of 75° C. to 80° C., and any appropriate reaction temperature may be selected within this temperature range. When the reaction temperature is lower than 30° C., the reaction proceeds slowly, so that the reaction cannot finish, and when the reaction temperature is higher than 100° C., materials such as dimethylamine may volatilize, which are not preferred.

The reaction time is typically 0.5 to 24 hours, preferably about 1 to 10 hours.

In the step (III), the order of addition of the materials is not particularly limited. For example, compound (A1) as a starting material, dimethylamine, an aqueous formaldehyde solution, and optionally a solvent may be added simultaneously, or after compound (A1) as a starting material and dimethylamine are added, an aqueous formaldehyde solution may be added dropwise thereto.

After completion of the step (III) of reacting compound (A1) as a starting material with formaldehyde and dimethylamine, compound (D1), which is a target reaction product, can be separated and recovered from the resulting reaction mixture by a known method and used as a material for the next step (IV).

For example, after completion of the reaction, a solvent that separates from water, such as an aromatic hydrocarbon such as toluene or xylene, is added to the final reaction mixture as needed, and an aqueous layer is then separated. Water is added to the oil layer obtained to wash the oil layer, and the solvent is removed from the oil layer as needed by, for example, distillation. The resulting crude product containing the target compound may be directly used as a material for the next step. Alternatively, compound (D1) may be isolated and purified from the oil layer obtained by the treatments after completion of the reaction.

(Step IV)

The next step (IV) will be described below.

The step (IV) is a step of obtaining compound (E1) by using compound (D1) obtained in the step (III) as a material. The reaction in the step (IV) can be readily performed according to a known method in which compound (D1) is reacted with acetic anhydride. Here, instead of acetic anhydride, a carboxylic anhydride such as propionic anhydride, butyric anhydride, or benzoic anhydride can be reacted to replace the acetyl group of compound (E1) with a different acyloxy group.

In the step (IV), the amount of acetic anhydride used relative to the amount of compound (D1) is preferably equal to or greater than a stoichiometric amount. Specifically, the amount of acetic anhydride used is preferably in the range of 9 to 15 mol, more preferably 12 mol per mol of compound (D1).

Since acetic anhydride also serves as a solvent in the reaction, it is not necessary to use other solvents, but a non-aqueous solvent such as toluene or xylene may be used depending on the need in the reaction operation. The reaction temperature is preferably in the range of 80° C. to 130° C., more preferably in the range of 100° C. to 130° C., particularly preferably in the range of 120° C. to 125° C. When the reaction temperature is lower than 80° C. or higher than 130° C., a large amount of impurities are formed, which is not preferred. The reaction time is typically about 0.5 to 40 hours, preferably about 5 to 20 hours.

After completion of the reaction, the target compound (E1) can be separated and recovered from the resulting final reaction mixture by a known method and can be used as a material for the next step (V). For example, after completion of the reaction, unreacted acetic anhydride, the solvent added as needed, and the like are distilled off from the final reaction mixture to obtain a crude product containing the target compound. This crude product may be directly used as a material for the next step (V), or the crude product obtained may be isolated and purified to obtain compound (E1).

(Step V)

The next step (V) will be described below.

The step (V) is a step of reacting compound (E1) obtained in the step (IV) with methanol in the presence of a catalyst to obtain the target compound (C1). Here, instead of methanol, a saturated aliphatic alcohol having 2 to 4 carbon atoms, such as ethyl alcohol, n-propyl alcohol, isopropyl alcohol, or n-butyl alcohol, can be reacted to replace the methoxymethyl group of compound (C1) with a different alkoxymethyl group.

The amount of methanol used in the step (V) relative to the amount of compound (E1) is preferably in a molar ratio equal to or greater than a stoichiometric amount, and methanol is typically used in excess relative to compound (E1) so as to also serve as a reaction solvent. The amount used is not particularly limited as long as it is equal to or greater than the stoichiometric amount, but specifically, for example, it is in the range of 6 to 12 times by weight, preferably 7 times by weight.

Specific examples of the catalyst used in the step (V) include acid catalysts such as sulfuric acid and p-toluenesulfonic acid; alkaline catalysts such as potassium carbonate, sodium carbonate, potassium hydroxide, sodium hydroxide, and sodium methylate; and carboxylates such as sodium acetate and potassium acetate. Preferred are acid catalysts. The appropriate amount of catalyst used varies depending on the type of catalyst. For example, in the case of sulfuric acid, the amount used is preferably in the range of 1 to 20 mol %, more preferably 10 mol % relative to the amount of compound (E1). When the amount of catalyst used exceeds 20 mol %, the reaction proceeds excessively to produce a large amount of impurities, which is not preferred.

Since the saturated aliphatic alcohol having 1 to 4 carbon atoms also serves as a solvent in the reaction, it is usually not necessary to use other solvents, but a non-aqueous solvent such as toluene or xylene may be used depending on the need in the reaction operation.

The reaction temperature is preferably in the range of 40° C. to 70° C., more preferably in the range of 50° C. to 65° C., particularly preferably in the range of 55° C. to 60° C. When the reaction temperature is lower than 40° C., the formation of polymers occurs preferentially, which is not preferred, and when the reaction temperature is higher than 70° C., the reaction proceeds rapidly to form a large amount of polymers, which is not preferred. The reaction time is typically about 1 to 240 hours, preferably about 5 to 100 hours.

In the step (V), the order of addition of the materials is not particularly limited. For example, compound (E1), methanol, and a catalyst may be added simultaneously, or after methanol and a catalyst are mixed, compound (E1) may be added thereto.

After completion of the step (V), the target compound (C1) can be purified by separation from the resulting final reaction mixture according to a conventional method and isolated as a crude product or a high-purity product. For example, when an acid catalyst is used, after completion of the reaction, the final reaction mixture is neutralized by adding an alkali, and excess methanol and the like are distilled off as needed, after which a solvent that separates from water is added, and washing with water is performed. The solvent is removed as needed by, for example, distillation, whereby the target compound can be obtained as a crude product. The crude product can be further purified by, for example, column chromatography to obtain compound (C1) with high purity.

The substituted trisphenol compound represented by formula (2), which is a compound of the present invention, particularly, the substituted trisphenol compound represented by formula (2b) is a compound useful as a crosslinking agent for a photosensitive resin. The substituted trisphenol compound represented by formula (3), which is a compound of the present invention, is an intermediate important in producing the substituted trisphenol compound represented by formula (2). Furthermore, the substituted trisphenol compound represented by formula (4), which is a compound of the present invention, is an intermediate important in producing the substituted trisphenol compound represented by formula (2), and in particular, the substituted trisphenol compound represented by formula (4b) is a compound useful also as a curing agent for an epoxy resin.

EXAMPLES

The present invention will now be described more specifically with reference to Examples, but it should be noted that the present invention is not limited to these Examples.

The method of analysis is as follows.

<Analysis Apparatus and Analysis Conditions>

(1) Conditions of analysis of compound (B1) and compound (B2)

Measuring apparatus: Shimadzu HPLC LC-20 series (manufactured by Shimadzu Corporation)
Pump: LC-20AT
Column oven: CTO-20A
Detector: SPD-20A (HPLC); cell length, 1 cm
Column: Shim-pack CLC-ODS (column, 6.0×150 mm; particle size, 5 μm; manufactured by Shimadzu GLC Ltd.)
Oven temperature: 50° C.
Flow rate: 1.0 ml/min
Mobile phase: (i) 0.2 vol % aqueous acetic acid solution, (ii) MeOH
Gradient conditions: (i) volume % (time from start of analysis)
30% (0 min)→82.5% (30 min)→100% (35 min)→100% (45 min)
Detection wavelength: 280 nm
Sample concentration: 50 mg/50 ml
Sample injection volume: 20 μl (2) Conditions of analysis of compound (C1), compound (C2), compound (E1), and compound (E2)

Measuring apparatus: Shimadzu HPLC LC-20 series (manufactured by Shimadzu Corporation)
Pump: LC-20AT
Column oven: CTO-20A
Detector: SPD-20A (HPLC); cell length, 1 cm
Column: Shim-pack CLC-ODS (column, 6.0× 150 mm; particle size, 5 μm; manufactured by Shimadzu GLC Ltd.)
Oven temperature: 50° C.
Flow rate: 1.0 ml/min
Mobile phase: (i) 0.2 vol % aqueous acetic acid solution, (ii) MeOH
Gradient conditions: (i) volume % (time from start of analysis)
50% (0 min)→100% (30 min)→100% (45 min)
Detection wavelength: 280 nm
Sample concentration: 50 mg/50 ml
Sample injection volume: 20 μl (3) Conditions of analysis of compound (D1) and compound (D2)

Measuring apparatus: Shimadzu HPLC LC-20 series (manufactured by Shimadzu Corporation)
Pump: LC-20AT
Column oven: CTO-20A
Detector: SPD-20A (HPLC); cell length, 1 cm
Column: Shim-pack CLC-ODS (column, 6.0×150 mm; particle size, 5 μm; manufactured by Shimadzu GLC Ltd.)
Oven temperature: 50° C.
Flow rate: 1.0 ml/min
Mobile phase: (i) 0.1 vol % aqueous phosphoric acid solution, (ii) MeOH
Gradient conditions: (i) volume % (time from start of analysis)
5% (0 min)→100% (30 min)→100% (45 min)
Detection wavelength: 280 nm
Sample concentration: 50 mg/50 ml
Sample injection volume: 20 μl (4) Conditions of solubility measurement and analysis of comparative compounds (x) and (y)

Measuring apparatus: Shimadzu UFLC LC-20 series (manufactured by Shimadzu Corporation)
Pump: LC-20AD
Column oven: CTO-20A
Detector: SPD-20A (UFLC); cell length, 5 mm
Column: HALO-C18 (column, 3.0×75 mm; particle size, 2.7 μm; manufactured by Advanced Materials Technology)
Oven temperature: 50° C.
Flow rate: 0.7 ml/min
Mobile phase: (i) 0.2 vol % aqueous acetic acid solution, (ii) MeOH
Gradient conditions: (i) volume % (time from start of analysis)
50% (0 min)→100% (7.5 min)→100% (10 min)
Detection wavelength: 280 nm
Sample concentration: compound (x), 50 mg/50 ml; compound (y), 120 mg/50 ml
Sample injection volume: 5 μl Example 1: Synthesis of Compound (B1): Step (I)

Step (I): In a 2 L four-necked flask equipped with a thermometer, a stirrer, a dropping funnel, and a condenser, 80.0 g (0.24 mol) of compound (A1) and 191.4 g (0.72 mol) of a 15% aqueous sodium hydroxide solution were placed, and 184.6 g (2.15 mol) of 35% formalin was added dropwise over 1 hour while maintaining the temperature at 25° C. to 30° C. Stirring was performed at 25° C. to 30° C. for 11 hours. Compound (B1) constituted 85% (HPLC area %) of the reaction solution. The reaction solution was added into a mixed solvent of methyl ethyl ketone and toluene. Dilute sulfuric acid was added dropwise thereto, and the mixture was stirred to perform neutralization. Thereafter, an aqueous layer was separated, and distilled water was added to the oil layer obtained. Stirring and washing with water were performed, and an aqueous layer was separated and removed.

Furthermore, the oil layer obtained was subjected to the same water-washing operation twice, and the resulting oil layer was concentrated under reduced pressure to distill off the solvent, thereby obtaining 123.1 g of compound (B1). Compound (B1) obtained was purified by preparative HPLC to obtain compound (B1) with a purity of 98.6% (HPLC area %).

The analytical results are shown below.

Molecular weight of compound (B1) (liquid chromatography mass spectrometry/atmospheric pressure chemical ionization: 513.2 (M–H)⁻

1H-NMR (400 MHz, Methanol-d4/TMS): δ1.65 (s, 3H), 2.27-2.34 (m, 4H), 4.65 (s, 12H), 4.89 (br.s, 9H), 6.87 (s, 2H), 7.03 (s, 4H).

Example 2: Synthesis of Compound (C1): Step (I)→Step (II)

Step (I): In a 2 L four-necked flask equipped with a thermometer, a stirrer, a dropping funnel, and a condenser, 80.0 g (0.24 mol) of compound (A1) and 191.4 g (0.72 mol) of a 15% aqueous sodium hydroxide solution were placed, and 184.6 g (2.15 mol) of 35% formalin was added dropwise over 1 hour while maintaining the temperature at 25° C. to 30° C. Stirring was performed at 25° C. to 30° C. for 11 hours. Compound (B1) constituted 85% (HPLC area %) of the reaction solution. The reaction solution was added into a mixed solvent of methyl ethyl ketone and toluene. Dilute sulfuric acid was added dropwise thereto, and the mixture was stirred to perform neutralization. Thereafter, an aqueous layer was separated, and distilled water was added to the oil layer obtained. Stirring and washing with water were performed, and an aqueous layer was separated and removed. Furthermore, the oil layer obtained was subjected to the same water-washing operation twice, and the resulting oil layer was concentrated under reduced pressure to distill off the solvent.

Step (II): Methanol was added to the concentrate obtained to distill off the solvent, and 1107.9 g of methanol and 36.9 g of 98% sulfuric acid were added. The mixture was heated so as to have an inside temperature of 58° C. to 60° C. and stirred for 16 hours. Compound (C1) constituted 74.5% (HPLC area %) of the reaction solution. Subsequently, a 16% aqueous sodium hydroxide solution and 75% phosphoric acid were added to the final reaction solution obtained, and methanol and the like were removed by distillation, after which an operation involving addition of toluene and water, stirring, and subsequent separation of an aqueous layer was performed, and toluene was distilled off by reduced-pressure distillation to obtain compound (C1) with a purity of 74.4% (HPLC area %).

Example 3: Synthesis of Compound (D1): Step (III)

Step (III): To a 3 L four-necked flask equipped with a thermometer, a stirrer, a dropping funnel, and a condenser, 250 g (0.75 mol) of compound (A1), 250.1 g of 2-propanol, and 513.4 g (5.98 mol) of 35% formalin were added, and 537.7 g (5.96 mol) of a 50% aqueous dimethylamine solution was added into the solution. While maintaining the inside temperature at 80° C. to 85° C., stirring was performed for 3 hours. Compound (D1) constituted 96% (HPLC area %) of the reaction solution.

Subsequently, the final reaction solution obtained was distilled, and toluene was added to the resulting distillation residue. After the oil layer was subjected to a water-washing operation twice, a Dean-Stark tube was connected to the flask to perform a reflux operation, thereby removing water from the system. Thereafter, toluene was distilled off by reduced-pressure distillation to obtain compound (D1) with a purity of 95.0% (HPLC area %).

The analytical results are shown below.

Molecular weight (liquid chromatography mass spectrometry/atmospheric pressure chemical ionization: 675.5 (M−H)⁻

1H-NMR (400 MHz, Methanol-d4/TMS): δ1.62 (s, 3H), 2.22 (s, 24H), 2.27-2.31 (m, 16H), 3.51 (s, 4H), 3.52 (s, 8H), 4.93 (br.s, 3H), 6.76 (s, 2H), 6.91 (s, 4H).

Example 4: Synthesis of Compound (E1): Step (III)→Step (IV)

Step (III): To a 3 L four-necked flask equipped with a thermometer, a stirrer, a dropping funnel, and a condenser, 250 g (0.75 mol) of compound (A1), 250.1 g of 2-propanol, and 513.4 g (5.98 mol) of 35% formalin were added, and 537.7 g (5.96 mol) of a 50% aqueous dimethylamine solution was added into the solution. While maintaining the inside temperature at 80° C. to 85° C., stirring was performed for 3 hours. Compound (D1) constituted 96% (HPLC area %) of the reaction solution.

Subsequently, the final reaction solution obtained was distilled, and toluene was added to the resulting distillation residue. After the oil layer was subjected to a water-washing operation twice, a Dean-Stark tube was connected to the flask to perform a reflux operation, thereby removing water from the system.

Step (IV): Thereafter, the inside temperature was reduced to 78° C., and 918.0 g (12.0 mol) of acetic anhydride was added over 2 hours. After completion of the addition, stirring was performed for 3 hours while maintaining the inside temperature at 120° C. to 125° C. Compound (E1) constituted 92% (HPLC area %) of the reaction solution. Subsequently, the final reaction solution obtained was subjected to reduced-pressure distillation to distill off unreacted acetic anhydride and the like, thereby obtaining compound (E1) with a purity of 92.9% (HPLC area %).

The analytical results are shown below.

Molecular weight (liquid chromatography mass spectrometry/atmospheric pressure chemical ionization: 915.3 (M+Na)⁺

1H-NMR (400 MHz, Methanol-d4/TMS): δ1.75 (s, H), 1.97 (s, 12H), 2.00 (s, 6H), 2.28 (s, 3H), 2.30 (s, 6H), 2.39-2.48 (m, 4H), 5.00 (s, 4H), 5.01 (s, 8H), 7.22 (s, 2H), 7.34 (s, 4H).

Example 5: Synthesis of Compound (C1): Step (III)→Step (IV)→Step (V)

Step (III): To a 3 L four-necked flask equipped with a thermometer, a stirrer, a dropping funnel, and a condenser, 250 g (0.75 mol) of compound (A1), 250.1 g of 2-propanol, and 513.4 g (5.98 mol) of 35% formalin were added, and 537.7 g (5.96 mol) of a 50% aqueous dimethylamine solution was added into the solution. While maintaining the inside temperature at 80° C. to 85° C., stirring was performed for 3 hours. Compound (D1) constituted 96% (HPLC area %) of the reaction solution.

Subsequently, the final reaction solution obtained was distilled, and toluene was added to the resulting distillation residue. After the oil layer was subjected to a water-washing operation twice, a Dean-Stark tube was connected to the flask to perform a reflux operation, thereby removing water from the system.

Step (IV): Thereafter, the inside temperature was reduced to 78° C., and 918.0 g (12.0 mol) of acetic anhydride was added over 2 hours. Thereafter, the stirring was performed for 3 hours while maintaining the inside temperature at 120° C. to 125° C. Compound (E1) constituted 92% (HPLC area %) of the reaction solution.

Step (V): Subsequently, the final reaction solution obtained was subjected to reduced-pressure distillation to distill off unreacted acetic anhydride and the like and then cooled. At around 50° C., 4,687.7 g of methanol and 14.3 g (0.075 mol) of p-toluenesulfonic acid monohydrate were added, and stirring was performed for 11 hours while maintaining the inside temperature at 59° C. to 60° C. Compound (C1) constituted 98.0% (HPLC area %) of the reaction solution.

Subsequently, 16% sodium hydroxide and 75% phosphoric acid were added to the final reaction solution obtained, and methanol and the like were removed by distillation, after which an operation involving addition of toluene and water, stirring, and subsequent separation of an aqueous layer was performed. Thereafter, toluene was distilled off by reduced-pressure distillation. Ethyl lactate widely used as a resist solvent was added, and redistillation was performed. Ethyl lactate was added again to adjust the solids concentration to 42.9% (calculated by quantifying ethyl lactate in an HPLC absolute calibration curve), which was used to calculate the yield. Compound (C1) as an oil was obtained with a purity of 97.5% (HPLC area %) in 95 mol % yield (relative to compound (A1)).

The analytical results are shown below.

Molecular weight (liquid chromatography mass spectrometry/atmospheric pressure chemical ionization: 597.3 (M−H)⁻

1H-NMR (400 MHz, Methanol-d4/TMS): δ1.62 (s, 3H), 2.27 (br.s, 4H), 3.34 (s, 12H), 3.37 (s, 6H), 4.48 (s, 4H), 4.49 (s, 8H), 4.88 (br.s, 3H), 6.88 (s, 2H), 7.04 (s, 4H).

Example 6: Synthesis of Compound (D2): Step (III)

[Chem. 21]

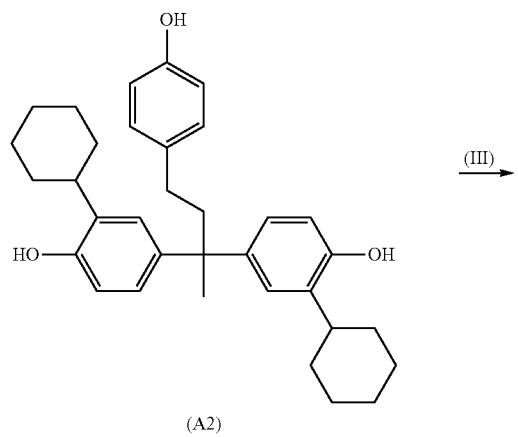

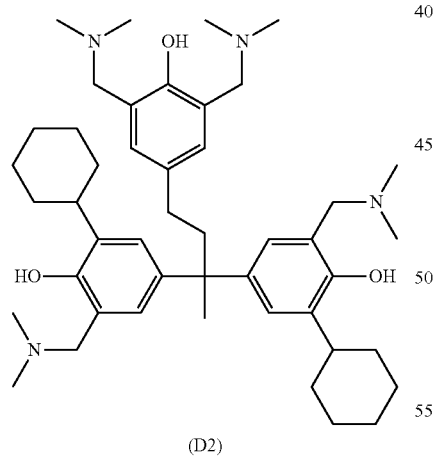

Step (III): In a 500 mL four-necked flask equipped with a thermometer, a stirrer, a dropping funnel, and a condenser, 30 g (0.06 mol) of compound (A2) above, 30.0 g of 2-propanol, and 39.8 g (0.46 mol) of 35% formalin were added, and 40.1 g (0.44 mol) of 50% dimethylamine was added into the solution. While maintaining the inside temperature at 80° C. to 85° C., stirring was performed for 13.5 hours. Compound (D2) constituted 97.1% (HPLC area %) of the reaction solution.

Subsequently, the final reaction solution obtained was distilled, and toluene was added to the resulting distillation residue. After the oil layer was subjected to a water-washing operation twice, a Dean-Stark tube was connected to the flask to perform a reflux operation, thereby removing water from the system. Thereafter, toluene was distilled off by reduced-pressure distillation to obtain compound (D2) with a purity of 98.6% (HPLC area %).

The analytical results are shown below.

Molecular weight (liquid chromatography mass spectrometry/atmospheric pressure chemical ionization: 727.6 (M+H)⁺

1H-NMR (400 MHz, Methanol-d4/TMS): δ1.21-1.48 (m, 10H), 1.60 (s, 3H), 1.73-1.82 (m, 10H), 2.24-2.32 (m, 28H), 2.93 (t, 2H), 3.57 (d, 8H), 4.90 (br.s, 3H), 6.74-6.86 (m, 6H).

Example 7: Synthesis of Compound (E2): Step (III)→Step (IV)

[Chem. 22]

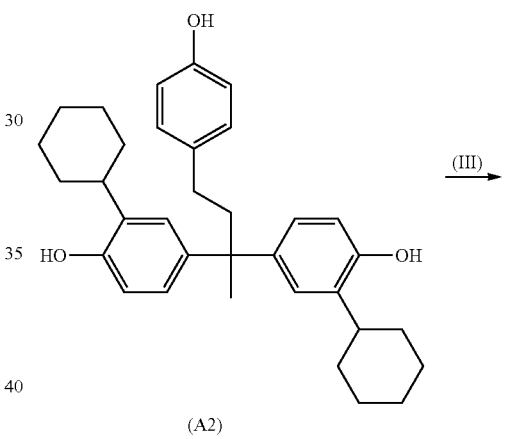

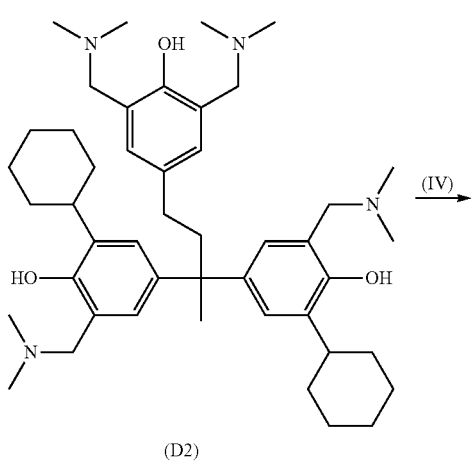

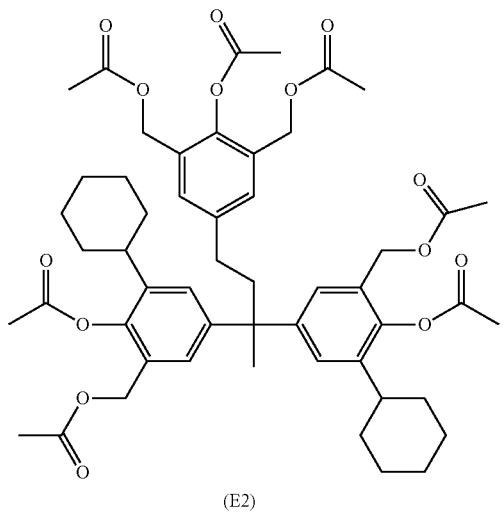

(E2)

Step (III): In a 500 mL four-necked flask equipped with a thermometer, a stirrer, a dropping funnel, and a condenser, 30 g (0.06 mol) of compound (A2) above, 30.0 g of 2-propanol, and 39.8 g (0.46 mol) of 35% formalin were added, and 40.1 g (0.44 mol) of 50% dimethylamine was added into the solution. While maintaining the inside temperature at 80° C. to 85° C., stirring was performed for 13.5 hours. Compound (D2) constituted 97.1% (HPLC area %) of the reaction solution.

Subsequently, the final reaction solution obtained was distilled, and toluene was added to the resulting distillation residue. After the oil layer was subjected to a water-washing operation twice, a Dean-Stark tube was connected to the flask to perform a reflux operation, thereby removing water from the system.

Step (IV): Thereafter, the inside temperature was reduced to 80° C., and 74.2 g (0.73 mol) of acetic anhydride was added over 2 hours. After completion of the addition, stirring was performed for 18.5 hours while maintaining the inside temperature at 120° C. to 125° C. Compound (E2) constituted 90.7% (HPLC area %) of the reaction solution. Subsequently, the final reaction solution obtained was subjected to reduced-pressure distillation to distill off unreacted acetic anhydride and the like, thereby obtaining compound (E2) with a purity of 90.6% (HPLC area %).

The analytical results are shown below.

Molecular weight (liquid chromatography mass spectrometry/atmospheric pressure chemical ionization: 913.5 $(M+H)^+$ 1H-NMR (400 MHz, Methanol-d4/TMS): δ1.23-1.43 (m, 10H), 1.72-1.85 (m, 13H), 2.02 (d, 12H), 2.34 (d, 9H), 2.45 (s, 4H), 2.54 (t, 2H), 5.03 (d, 8H), 7.15-7.23 (m, 6H).

Example 8: Synthesis of Compound (C2): Step (III)→Step (IV)→Step (V)

[Chem. 23]

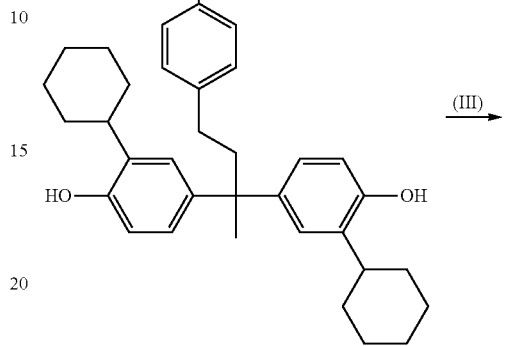

(A2)

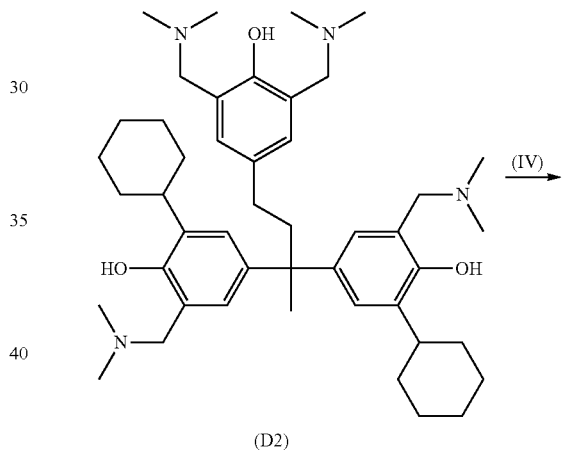

(D2)

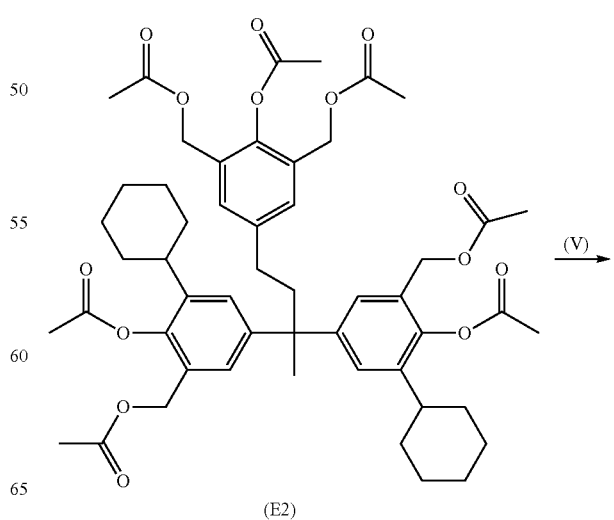

(E2)

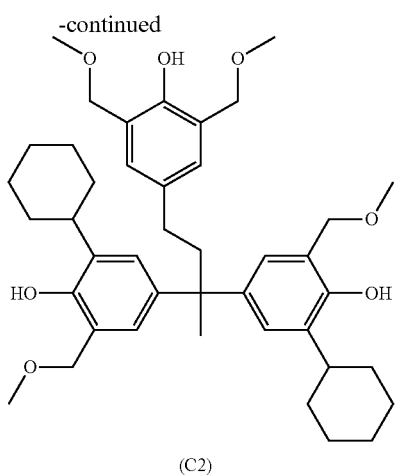

(C2)

Step (III): In a 500 mL four-necked flask equipped with a thermometer, a stirrer, a dropping funnel, and a condenser, 30 g (0.06 mol) of compound (A2) above, 30.0 g of 2-propanol, and 39.8 g (0.46 mol) of 35% formalin were added, and 40.1 g (0.44 mol) of 50% dimethylamine was added into the solution. While maintaining the inside temperature at 80° C. to 85° C., stirring was performed for 13.5 hours. Compound (D2) constituted 97% (HPLC area %) of the reaction solution.

Subsequently, the final reaction solution obtained was distilled, and toluene was added to the resulting distillation residue. After the oil layer was subjected to a water-washing operation twice, a Dean-Stark tube was connected to the flask to perform a reflux operation, thereby removing water from the system.

Step (IV): Thereafter, the inside temperature was reduced to 80° C., and 74.2 g (0.73 mol) of acetic anhydride was added over 2 hours. After completion of the addition, stirring was performed for 18.5 hours while maintaining the inside temperature at 120° C. to 125° C. Compound (E2) constituted 90.7% (HPLC area %) of the reaction solution.

Step (V): Subsequently, the final reaction solution obtained was subjected to reduced-pressure distillation to distill off unreacted acetic anhydride and the like and then cooled. At around 50° C., 246.1 g of methanol and 1.0 g (0.005 mol) of p-toluenesulfonic acid monohydrate were added, and stirring was performed for 10 hours while maintaining the inside temperature at 60° C. Compound (C2) constituted 95.9% (HPLC area %) of the reaction solution.

Subsequently, 16% sodium hydroxide and 75% phosphoric acid were added to the final reaction solution obtained, and methanol and the like were removed by distillation, after which an operation involving addition of butyl acetate and water, stirring, and subsequent separation of an aqueous layer was performed. Thereafter, butyl acetate was distilled off by reduced-pressure distillation to obtain compound (C2) as an oil with a purity of 97.1% (HPLC area %). The yield was 83.8 mol % (relative to compound (A2)).

The analytical results are shown below.

Molecular weight (liquid chromatography mass spectrometry/atmospheric pressure chemical ionization: 673.5 (M–H)$^-$ 1H-NMR (400 MHz, Methanol-d4/TMS): δ1.22-1.45 (m, 10H), 1.62 (s, 3H), 1.71-1.80 (m, 10H), 2.27 (s, 4H), 2.95 (t, 2H), 3.38 (d, 12H), 4.52 (d, 8H), 4.90 (br.s, 3H), 6.90-6.96 (m, 6H).

<Evaluation Test 1: Solubility at 30° C.>

For compound (C1) and compound (C2) obtained in Examples and the following two compounds having six functional groups likewise and reported as crosslinking agents, the solubility at 30° C. in ethyl lactate widely used as a resist solvent was measured. The following compounds are referred to as "comparative compound (x)" and "comparative compound (y)".

Comparative compound (x) and comparative compound (y) used were synthesized with reference to synthesis methods described in Synthesis Examples 3 and 4 of PTL 2.

[Chem. 24]

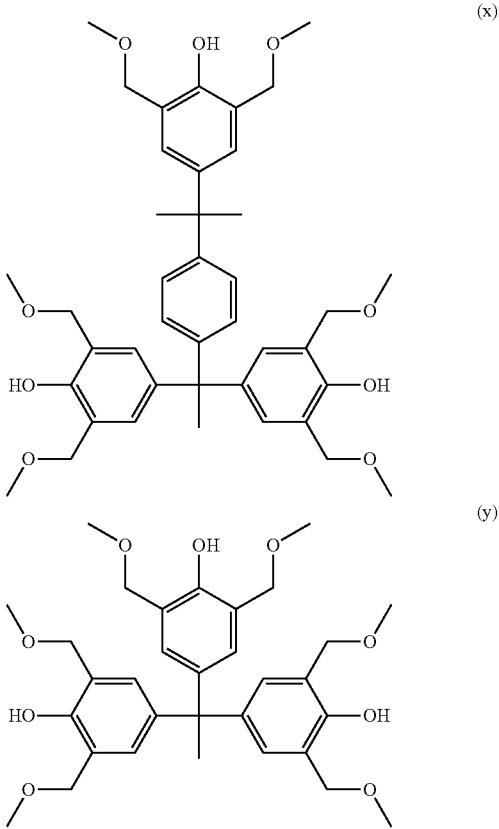

(Evaluation Method)

A cross-shaped stirrer and 10 g of ethyl lactate were added to a 100 ml test tube, and after 10 g of comparative compound (x) (or (y)) was added, a siphon was attached. Under nitrogen purge, the test tube was set in a pre-conditioned water bath at 30° C. and stirred with the stirrer for 3 hours. After the stirring for 3 hours, the internal solution was sampled with a pipette, and solids were filtered off from the sampled solution through a syringe filter to put a filtrate in a 50 ml measuring flask. This was diluted to the 50 ml mark with methanol for HPLC and analyzed with a high-performance liquid chromatography analyzer. From the results obtained, comparative compound (x) (or (y)) in the filtrate was quantified using the peak area of comparative compound (x) (or (y)), and the solubility (=quantitative value (mg) of comparative compound (x) or (y)/(weight (mg) of filtrate put in 50 ml measuring flask through syringe filter-quantitative value (mg) of comparative compound (x) or (y)) was calculated.

Method of constructing calibration curve: comparative compound (x) (or (y)) used in the test was analyzed by HPLC, and an approximate straight line obtained by plotting the peak area of comparative compound (x) (or (y)) on the horizontal axis and the concentration (mg/50 ml) of comparative compound (x) (or (y)) on the vertical axis with "intercept=0" was used as a calibration curve of comparative compound (x) (or (y)).

TABLE 1

|  | Purity (%) | Solubility (g/100 g, 30° C.) |
| --- | --- | --- |
| Compound (C1) | 97.5 | 75.1 |
| Compound (C2) | 97.1 | 100.0< |
| Comparative compound (x) | 93.5 | 38.7 |
| Comparative compound (y) | 88.2 | 84.0 |

As shown in Table 1, it was revealed that compound (C1), the inventive compound, had improved solubility in ethyl lactate about twice higher than that of comparative compound (x) reported to be useful as a crosslinking agent and was somewhat less soluble in ethyl lactate than comparative compound (y) reported to be useful as a crosslinking agent.

It was also been revealed that the solubility of compound (C2), the inventive compound, was as high as more than 100.0 g/100 g, showing that compound (C2) had improved solubility in ethyl lactate more than twice higher than that of comparative compound (x) and was more soluble in ethyl lactate than comparative compound (y).

<Evaluation Test 2: Low-Temperature Storage Stability (Dissolution Stability)>

Using compound (C1), the inventive compound, whose solubility in ethyl lactate at 30° C. was comparable to that of comparative compound (y) in "Evaluation test 1" and compound (C2), the inventive compound, whose solubility was higher than that of comparative compound (y) in "Evaluation test 1", low-temperature storage tests of ethyl lactate solutions at refrigerated (5° C.) and frozen (−5° C.) temperatures were performed.

(Evaluation Method)

In a 50 ml screw tube, 4.29 g of compound (C1), the inventive compound, and 5.71 g of ethyl lactate were placed and mixed, and the screw tube was put in a water bath set at 30° C. and stirred by shaking it by hand. Complete dissolution was visually observed, thus preparing an ethyl lactate solution with a compound (C1) concentration of 42.9 wt %.

In the same manner as for compound (C1), an ethyl lactate solution with a compound (C2) concentration of 40 wt %, an ethyl lactate solution with a compound (C2) concentration of 50 wt %, and an ethyl lactate solution with a compound (y) concentration of 40 wt % were prepared.

These solutions were subjected to solution storage tests in a refrigerator (5° C.) and a freezer (−5° C.) for 30 days.

According to the following evaluation criteria, the evaluation results are listed in Table 2.

[Evaluation Criteria]

○: Completely dissolved, and neither precipitation of crystals nor separation of oily components can be visually observed.

x: Precipitation of crystals or separation of oily components can be visually observed.

TABLE 2

|  | Purity (%) | Solution concentration (wt %) | 5° C. | −5° C. |
| --- | --- | --- | --- | --- |
| Compound (C1) | 97.5 | 42.9 | ○ | ○ |
| Compound (C2) | 97.1 | 40.0 | ○ | ○ |
|  |  | 50.0 | ○ | ○ |
| Comparative compound (y) | 88.2 | 40.0 | x | x |

As shown in Table 2, it was confirmed that compound (C1) and compound (C2), the inventive compounds, did not crystallize at all and remained as transparent solutions even after the storage period of 30 days both at 5° C., the refrigerated temperature, and −5° C., the frozen temperature.

By contrast, it was revealed that comparative compound (y) whose solubility at 30° C. was somewhat higher than that of compound (C1), the inventive compound, experienced crystal precipitation both at 5° C., the refrigerated temperature, and −5° C., the frozen temperature, despite its low concentration. Moreover, although the test sample with precipitated crystals was left to stand at room temperature (22° C.) for one day, the precipitated crystals did not dissolve again.

The results of "Evaluation tests 1 and 2" suggest that comparative compound (x) and comparative compound (y) tend to crystallize because they both have basic skeletons with rigid chemical structures so that their molecular movement is restricted and stacking of molecules is likely to occur. By contrast, it is suggested that in the inventive compound, the introduction of flexibility of a basic skeleton including a linear alkylene group inhibited stacking of molecules and consequently suppressed crystallization, and crystals did not precipitate even under low-temperature storage conditions such as 5° C. and −5° C.

The invention claimed is:

1. A substituted trisphenol compound represented by formula (3):

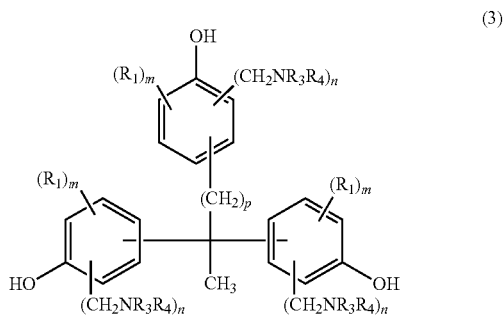

wherein $R_1$'s each independently represent a linear, branched, or cyclic alkyl group having 1 to 6 carbon atoms or a phenyl group, $R_3$'s and $R_4$'s each independently represent a linear, branched, or cyclic alkyl group having 1 to 6 carbon atoms or an aryl group having 6 to 8 carbon atoms, $R_3$ and $R_4$ are optionally bonded to each other to together form a cyclic secondary amino group optionally containing an oxygen atom or a sulfur atom and having 5 to 10 carbon atoms, n represents an integer of 1 or 2, m represents 0 or an integer of 1 to 3, and p represents an integer of 1 to 6, provided that m+n is an integer of 1 to 4.

2. A substituted trisphenol compound represented by formula (4):

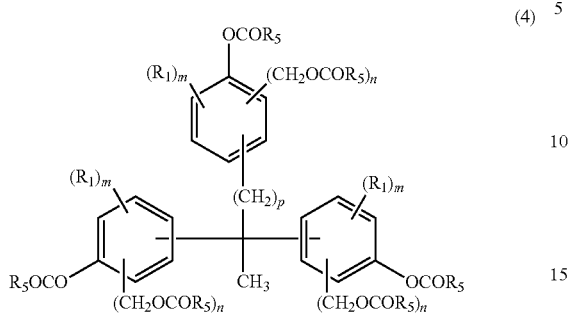
(4)

wherein $R_1$'s each independently represent a linear, branched, or cyclic alkyl group having 1 to 6 carbon atoms or a phenyl group, $R_5$'s each independently represent a linear, branched, or cyclic alkyl group having 1 to 6 carbon atoms or an aryl group having 6 to 8 carbon atoms, n represents an integer of 1 or 2, m represents 0 or an integer of 1 to 3, and p represents an integer of 1 to 6, provided that m+n is an integer of 1 to 4.

3. A substituted trisphenol compound represented by any of the following formulae:

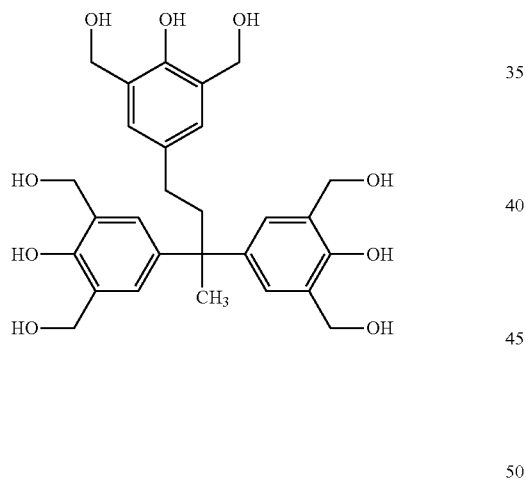

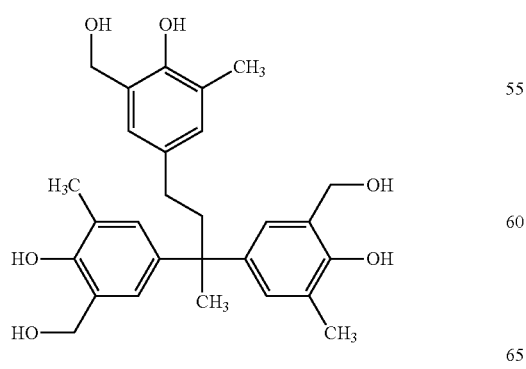

-continued

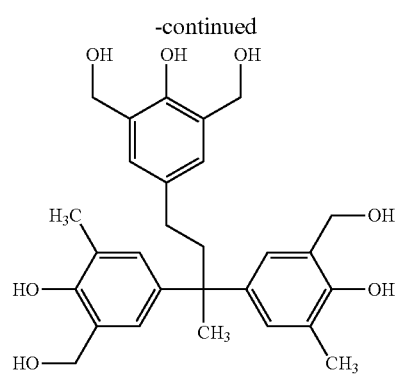

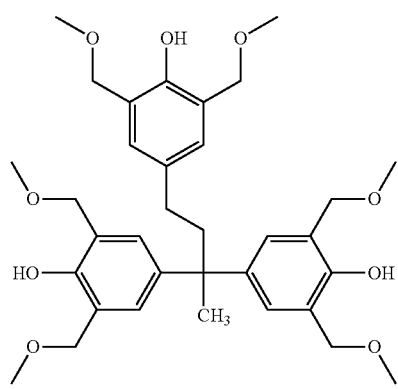

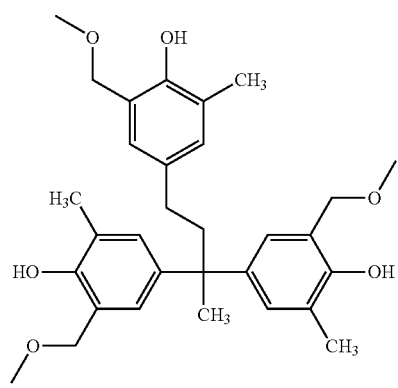

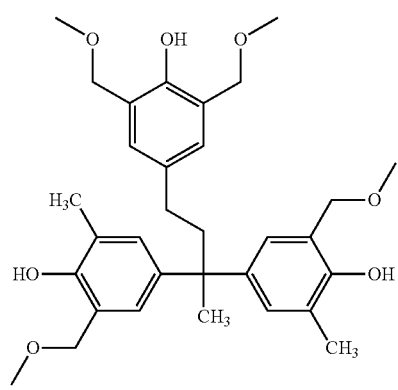

37
-continued
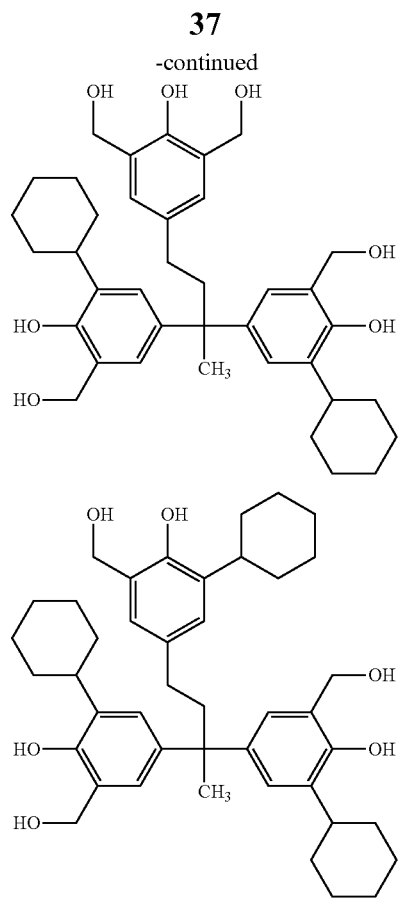
38
-continued
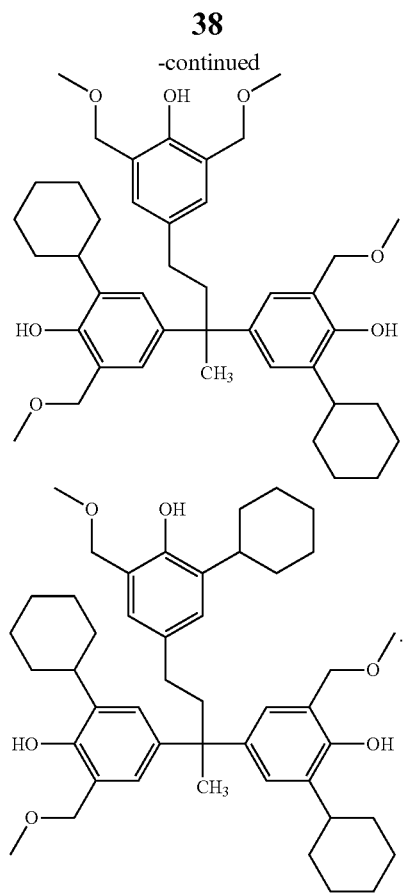
* * * * *